(12) United States Patent
Heinken et al.

(10) Patent No.: US 11,396,842 B2
(45) Date of Patent: Jul. 26, 2022

(54) METHOD AND DEVICES FOR OPERATING AN INTERNAL COMBUSTION ENGINE HAVING A SUPERCHARGING SYSTEM

(71) Applicant: Volkswagen Aktiengesellschaft, Wolfsburg (DE)

(72) Inventors: Sebastian Heinken, Braunschweig (DE); Javier Bartolome, Braunschweig (DE); Florian Frese, Braunschweig (DE); Sebastian Keich, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 58 days.

(21) Appl. No.: 16/843,452

(22) Filed: Apr. 8, 2020

(65) Prior Publication Data

US 2020/0325817 A1 Oct. 15, 2020

(30) Foreign Application Priority Data

Apr. 9, 2019 (DE) .................... 10 2019 205 044.1

(51) Int. Cl.
*F02B 37/18* (2006.01)
*F02B 27/00* (2006.01)
(Continued)

(52) U.S. Cl.
CPC ............ *F02B 37/183* (2013.01); *F02B 27/00* (2013.01); *F02B 37/04* (2013.01); *F02B 37/18* (2013.01);
(Continued)

(58) Field of Classification Search
CPC .. F02B 25/00–28; F02B 37/013; F02B 37/04; F02B 37/10; F02B 37/12;
(Continued)

(56) References Cited

U.S. PATENT DOCUMENTS 3,257,796 A * 6/1966 Updike ................. F02B 37/183
60/602
6,889,502 B1 * 5/2005 French ................ F02D 41/0007
60/601
(Continued)

FOREIGN PATENT DOCUMENTS

CN 109372628 A 2/2019
DE 101 59 801 A1 4/2003
(Continued)

*Primary Examiner* — Loren C Edwards
(74) *Attorney, Agent, or Firm* — Muncy, Geissler, Olds & Lowe, P.C.

(57) ABSTRACT

A method and device for operating an internal combustion engine having a supercharging system that has an exhaust turbocharger and an electrically driven compressor. An output of the exhaust turbocharger is adjustable by a control element. A boost pressure setpoint is determined for achieving an increased engine torque setpoint. The supercharging system is adjusted to build up the actual boost pressure in accordance with the boost pressure setpoint and a positive scavenging gradient in a cylinder of the internal combustion engine is adjusted as the overriding command variable for driving the supercharging system.

12 Claims, 4 Drawing Sheets

(51) Int. Cl.
    *F02B 37/04* (2006.01)
    *F02B 37/24* (2006.01)
    *F02B 39/10* (2006.01)
    *F02D 23/00* (2006.01)
    *F02D 41/24* (2006.01)
    *F02D 41/00* (2006.01)

(52) U.S. Cl.
    CPC .............. *F02B 37/24* (2013.01); *F02B 39/10* (2013.01); *F02D 23/00* (2013.01); *F02D 41/0007* (2013.01); *F02D 41/2406* (2013.01)

(58) Field of Classification Search
    CPC .. F02B 2037/122; F02B 37/18; F02B 37/183; F02B 37/186; F02B 37/22; F02B 37/225; F02B 37/24; F02B 39/10; F02D 23/00; F02D 23/005; F02D 23/02; F02D 41/0007; F02D 41/2406; F02D 2200/0406; F02D 41/1448
    See application file for complete search history.

(56) References Cited

U.S. PATENT DOCUMENTS

| | | |
|---|---|---|
| 7,540,148 B2 | 6/2009 | Wild et al. |
| 7,644,586 B2 * | 1/2010 | Yamagata ........... F02D 13/0249 60/612 |
| 8,931,274 B2 | 1/2015 | Han et al. |
| 9,879,620 B2 | 1/2018 | Makkapati et al. |
| 2003/0106541 A1 * | 6/2003 | Dixon ..................... F02B 39/10 123/565 |
| 2003/0159443 A1 | 8/2003 | Huter |
| 2007/0000481 A1 | 1/2007 | Baeurle et al. |
| 2007/0180824 A1 * | 8/2007 | Yamagata ............... F02B 37/24 60/599 |

FOREIGN PATENT DOCUMENTS

| | | |
|---|---|---|
| DE | 102 09 002 A1 | 9/2003 |
| DE | 103 40 142 A1 | 3/2005 |
| DE | 10 2004 003 607 B4 | 1/2009 |
| DE | 10 2011 007 301 A1 | 10/2012 |
| DE | 10 2011 055 299 A1 | 11/2012 |
| DE | 10 2012 009 288 A1 | 11/2012 |
| DE | 102012009288 A1 | 11/2012 |
| DE | 10 2013 008 826 A1 | 11/2014 |
| DE | 102013008826 A1 | 11/2014 |
| DE | 10 2014 208 092 A1 | 10/2015 |
| DE | 10 2014 210 026 A1 | 11/2015 |
| DE | 10 2014 221 331 A1 | 4/2016 |
| DE | 10 2016 121 287 A1 | 5/2017 |
| EP | 1816326 A1 | 8/2007 |
| EP | 2 766 586 B1 | 10/2017 |
| JP | 2015124681 A | 7/2015 |
| WO | WO03/027464 A1 | 4/2003 |

* cited by examiner

METHOD AND DEVICES FOR OPERATING AN INTERNAL COMBUSTION ENGINE HAVING A SUPERCHARGING SYSTEM

This nonprovisional application claims priority under 35 U.S.C. § 119(a) to German Patent Application No. 10 2019 205 044.1, which was filed in Germany on Apr. 9, 2019, and which is herein incorporated by reference.

BACKGROUND OF THE INVENTION

Field of the Invention

The present invention relates to a method for operating an internal combustion engine, and to a controller, an internal combustion engine, and a motor vehicle.

Description of the Background Art

Generally speaking, supercharging systems for internal combustion engines are known, especially in the automotive field, for the purpose of supplying air with an overpressure to cylinders of the internal combustion engines for the combustion of fuel.

In order to provide the air with an overpressure, turbochargers and supercharging blowers are known, for example. Turbochargers have a compressor, and they can be equipped with a separate drive for the compressor, for example an electric motor, or they are operated with, e.g., exhaust gas from the internal combustion engine, wherein the exhaust gas drives a turbine that is in operative connection with/coupled to the compressor by a shaft. The latter are also called exhaust turbochargers.

Furthermore, turbochargers with a bypass valve, also called a wastegate, and/or turbochargers with variable turbine geometry, which have adjustable, non-rotating guide vanes, are known. The gas throughput can be changed by adjusting the angle of incidence of the guide vanes. Typically, the angle of incidence of the guide vanes is set such that the output of the turbocharger is increased by reducing the flow cross-section in the event of low gas throughput and high required output, and is increased by increasing the flow cross-section in the event of high gas throughput and low required output. Nonetheless it is known, for example from DE 10 2014 210 026 A1, that a strong closing of the guide vanes typically also leads to a high exhaust gas back pressure, and thus to charge-exchange losses, which in turn oppose an effective torque buildup of a combustion engine.

Exhaust turbochargers with auxiliary drives are also known, such as from DE 10 2014 221 331 A1, for example. Here, an auxiliary drive on a shaft of the exhaust turbocharger is provided, and is controlled as a function of an instantaneous turbine geometry, and is engaged and operated as needed when, for example, the variable turbine geometry (VTG) is set to be efficiency-optimized, but sufficient drive power is not available for the compressor.

From DE 10 2016 121 287 A1 (which corresponds to U.S. Pat. No. 9,879,620) and DE 10 2014 208 092 A1, it is also known to provide an electrically driven compressor, in addition to an exhaust supercharger, for supercharging an internal combustion engine. According to DE 10 2014 208 092 A1, the electrically driven compressor is primarily actuated when sufficient or even excess electric energy is available for its operation. As a result, the charge air is primarily compressed by means of the electrically driven compressor, and a control system of the exhaust turbocharger, for example a variable turbine geometry or a wastegate, can be adjusted so as to reduce an exhaust gas back pressure in the exhaust turbocharger. As a result, reduced charge-exchange work is possible and, accordingly, reduced fuel consumption of the internal combustion engine.

As mentioned above, the use of a VTG can lead to high exhaust gas back pressures, which degrade charge exchange within the cylinder. Here, the scavenging gradient (difference between intake manifold pressure and pressure in the exhaust manifold) is a characteristic quantity for the degree of backflow of exhaust gas into the combustion chamber. If this scavenging gradient is negative, then a certain proportion of exhaust gas blows back into the combustion chamber during charge exchange, thus reducing the possible volume for fresh air. Under steady-state partial load, this definitely can be desirable in order to dethrottle the fresh air side and thereby increase engine efficiency. In positive engine dynamics, however, a maximum amount of air in the combustion chamber is necessary in order to be able to provide the fastest possible torque buildup.

Methods for controlling/operating internal combustion engines having supercharging systems that have an exhaust turbocharger and an electrically driven compressor are fundamentally known.

SUMMARY OF THE INVENTION

It is therefore an object of the present invention to provide an improved method for controlling/operating an internal combustion engine having such a supercharging system, in which the known disadvantages can be at least partially eliminated.

In an exemplary embodiment, a first aspect of the present disclosure relates to a method for operating an internal combustion engine having a supercharging system that has an exhaust turbocharger (ATL) and an electrically driven compressor, wherein an output of the ATL is adjustable by means of a control element, wherein the method includes: Determination of a boost pressure setpoint for achieving an increased engine torque setpoint; Adjustment of the supercharging system to build up an actual boost pressure in accordance with the boost pressure setpoint; and Adjustment of a positive scavenging gradient in a cylinder of the internal combustion engine as the overriding command variable for driving the supercharging system.

In connection with this invention, the terms "control," "adjustment," "driving," "controller," and "closed-loop control" can include controllers in the strict sense (without feedback) as well as closed-loop controls (with one or more control loops). "Command variable" should thus also be understood as a setpoint.

The internal combustion engine can be, e.g., a gasoline engine, and preferably a Miller-cycle engine.

The supercharging system has, among other things, an ATL that includes a compressor and a turbine, wherein the output of the ATL can be adjusted by means of the control element. In this context, the control element can include an aforementioned variable turbine geometry (VTG) so that an output of the ATL is adaptable. Alternatively or in addition, the control element can include a wastegate.

In addition to the ATL, the supercharging system has the electrically driven compressor. This compressor can be driven by means of an electric machine, for example. The electrically driven compressor is located (in an air supply line to the engine) downstream of the compressor of the ATL. Alternatively, it is also possible to locate the electrically driven compressor upstream of the compressor of the ATL.

In another alternative, the electrically driven compressor can also be the compressor of the ATL, wherein the electric machine is coupled, in particular directly, to a shaft of the ATL. As a result, the output of the ATL, in particular the output of the compressor of the ATL, is adjustable.

The increased engine torque setpoint can be derived, for example, from a driver command that is expressed by appropriate accelerator pedal operation by the driver. The increased engine torque setpoint expresses that the driver command is an acceleration command.

With knowledge of the increased engine torque setpoint, a corresponding boost pressure setpoint can be determined. The boost pressure setpoint can be a function that depends on the engine torque, for example, and can be placed/stored in a memory of a controller, e.g., an engine control unit, for example as a mathematical model and/or a characteristic map or characteristic curve.

In order to build up the boost pressure setpoint, the supercharging system is adjusted accordingly. This means, firstly, that the output of the ATL is adapted via the control element to build up the actual boost pressure, and secondly that the electrically driven compressor is driven with a corresponding output or with a corresponding speed setpoint to build up the actual boost pressure, so that the boost pressure setpoint is achieved. Thus, for example, the electrically driven compressor can be operated by means of an electric machine, wherein an output of the electric machine, and thus the compressor output, is adaptable.

During build-up of the actual boost pressure, a positive scavenging gradient is set in a cylinder of the internal combustion engine. The engine can have any number of cylinders, as for example three, four, six, eight, twelve, or the like. Here, only the scavenging gradient for one cylinder of the internal combustion engine is described by way of example. "Scavenging gradient" means the pressure difference across the cylinder, which is to say the difference between an intake manifold pressure upstream of the cylinder and the pressure that is present within an exhaust gas line of the engine downstream of the cylinder and upstream of the turbine of the ATL. The latter is generally referred to as "exhaust gas back pressure."

As mentioned above, the scavenging gradient is set such that it becomes positive. This means that the intake manifold pressure should be at least equal to, and in general greater than, the exhaust gas back pressure. The positive scavenging gradient serves as the overriding command variable for driving the supercharging system. "Overriding command variable" here means that the supercharging system is initially driven/adjusted such that the positive scavenging gradient is initially set in the cylinder, and the actual boost pressure then tracks the boost pressure setpoint. The scavenging gradient in the cylinder is thus kept positive, while the actual boost pressure tracks the boost pressure setpoint. "Kept positive" means that the scavenging gradient should be equal to or greater than 0 mbar.

Thus, because the positive scavenging gradient is initially set in the cylinder, it is possible to at least partially prevent exhaust gas from flowing back into the cylinder during a charge exchange of the cylinder. As a result, engine torque can be built up especially well, since charge-exchange losses resulting from exhaust gas flowing back (into the cylinder) can be avoided at least partially, if not even completely, through the positive scavenging gradient.

The control element can include the above-mentioned variable turbine geometry. As a result, an output of the ATL can be adapted/adjusted especially well.

In addition, the positive scavenging gradient can be achieved by the means that the electrically driven compressor and the ATL, in particular the control element thereof, are operated as a function of one another—which is to say are matched to one another.

The adjustment of the supercharging system in a first operating state can include an operation of the electrically driven compressor with an optimized maximum output and an operation of the control element in a first, open position. The first, open position of the control element can include a position that is opened as far as possible, for example. Alternatively, the first, open position can also include a position that is only briefly closed, which then transitions to a position that is opened as far as possible. The optimized maximum output depends on a capacity of an energy storage device (e.g., a battery), wherein the energy storage device supplies the (electric) machine for driving the electrically driven compressor. Depending on the capacity (available output), of the energy storage device, the electrically driven compressor can have different optimized maximum outputs. In other words, the optimized maximum output of the electrically driven compressor depends on the capacity of the energy storage device.

The operation of the control element in the first, open position means that the exhaust gas flowing out of the cylinder only partially drives the turbine. If the control element has the VTG, for example, then in the first, open position the VTG is set such that a flow cross-section of the turbine is at least partially, and preferably maximally, open. In contrast, if the control element has the wastegate, then the wastegate is adjusted such that the exhaust gas flowing out of the cylinder at least partially, and preferably completely, bypasses/flows around the turbine through the wastegate. An especially low exhaust gas back pressure can be set as a result of the first, open position of the control element. Because the electrically driven compressor is operated with its optimized maximum output and the control element in its first, open position, the positive scavenging gradient can be reached especially rapidly in this first operating state of the supercharging system while taking into account the capacity of the energy storage device.

Furthermore, when the positive scavenging gradient is reached in the first operating state, an output of the ATL for building up the actual boost pressure, and accordingly the output of the electrically driven compressor, can be reduced in a second operating state. In other words, once the positive scavenging gradient is set, the output of the electrically driven compressor is reduced correspondingly (and successively), while in parallel thereto the output of the ATL is reduced by means of the control element such that the actual boost pressure continues to be built up. In particular, in this process the ATL is adjusted/driven such that its output (in particular, a turbine output) is as high as possible without the scavenging gradient becoming negative, which is to say that the exhaust gas back pressure is greater than the intake manifold pressure. By means of the second operating state of the supercharging system, therefore, the actual boost pressure buildup can be built up (successively) by the ATL. Accordingly, access to the capacity of the energy storage device is also reduced by the reduction in the output of the electrically driven compressor, and the energy storage device is protected accordingly.

The electrically driven compressor can be operated in accordance with a first control variable, and the ATL in accordance with a second control variable. For this purpose, setpoints for the control variables are generated by means of a (drive) controller/closed-loop control in order to fulfill the requirements of the engine torque buildup.

The first control variable can also be determined on the basis of a first reduction factor, and the second control variable can be determined on the basis of a reduction factor. Here, the reduction factors represent a measure of how much the output of the electrically driven compressor and of the control element can be lowered/throttled. For the electrically driven compressor, a high first reduction factor corresponds to a (comparatively) lower output. For the control element, a high second reduction factor means that an output of the ATL is (comparatively) lower. Thus, a high reduction factor for the (second) control variable of the VTG corresponds to the circumstance that the VTG has a larger flow cross-section. A high second reduction factor for the (second) control variable of the wastegate means that more of the exhaust gas flowing out of the cylinder is directed around the turbine.

Thus, during adjustment of the supercharging system in the first operating state, the first reduction factor (for the electrically driven compressor) is initially set between 20% to 40%, preferably between 25% to 35%, and especially preferably to 30% (in particular as a function of the capacity of the energy storage device), for which reason the electrically driven compressor is operated at its optimized maximum output. In contrast, the second reduction factor (for the ATL or its control element) is adapted or chosen such that the positive scavenging gradient is adjusted rapidly and while taking the capacity of the energy storage device into account.

In the second operating state, the first reduction factor is increased (continuously) and the second reduction factor is increased (correspondingly). In this process, the first reduction factor is increased enough that an output of the electrically driven compressor is zero, which is to say can be taken out of operation. In particular, the electrically driven compressor is out of operation as soon as the actual boost pressure reaches the boost pressure setpoint. At the same time, the second reduction factor is increased in the second operating state such that the ATL builds up the actual boost pressure in an overriding manner without a negative scavenging gradient arising in this process. As a result, an energetically improved, if not even optimal, charge exchange and torque buildup is made possible.

The first and/or the second reduction factor can be determined as a function of a scavenging gradient, in particular an actual scavenging gradient, of a valve overlap, of the capacity of the energy storage device (which is to say an energy storage device coupled to the electrically driven compressor), and/or of an ignition angle. With the aid of the valve overlap, a time of opening and closing of the intake and exhaust valves of a cylinder can be determined at least indirectly.

The determination of the first or second reduction factor can take place by means of characteristic maps and/or characteristic curves. These can be stored in an engine control unit, for example, and thus are easily accessible and rapidly retrievable.

Furthermore, the characteristic maps and/or characteristic curves can be determined empirically or can be created by means of models, for example mathematical models.

The second control variable (for the control element) can be greater than a predetermined precontrol variable.

The control element of the ATL can include the above-described wastegate. As a result, an exhaust gas back pressure and an output of the ATL can be adapted/adjusted especially well, much like with a VTG.

Furthermore, the present disclosure provides a controller for an internal combustion engine, wherein the controller is equipped to carry out the method according to one of the preceding claims.

The present disclosure also provides an internal combustion engine with an abovementioned supercharging system and with a controller according to the second aspect.

The present disclosure also provides a motor vehicle with an internal combustion engine according to the third aspect.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
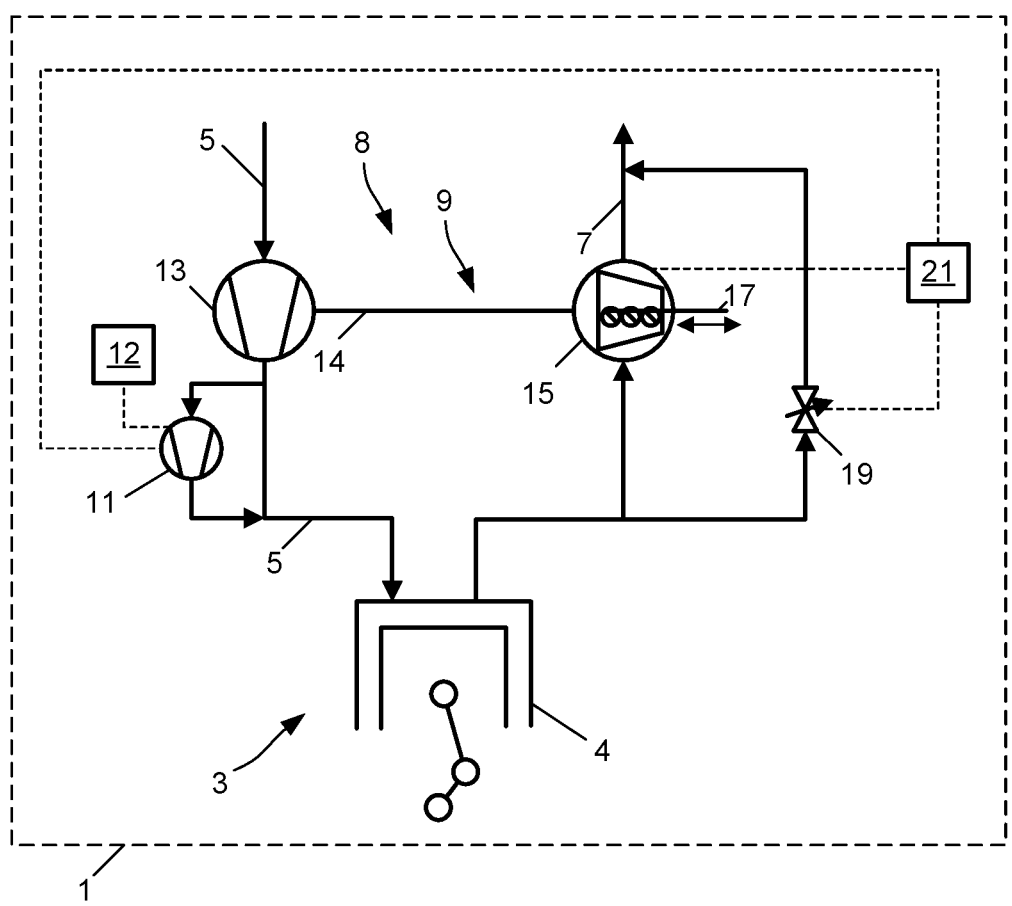
FIG. 1 is a schematically represented exemplary embodiment of a motor vehicle with an internal combustion engine.

FIG. 1 shows a motor vehicle 1 with an internal combustion engine 3 (combustion engine) and a supercharging system 8 that is controlled by a controller 21, which is implemented as, for example, an engine control unit. The supercharging system 8 includes an exhaust turbocharger (ATL) 9 and an electrically driven compressor 11. An energy storage device 12 is coupled to the electrically driven compressor 11 in order to supply the same with electric energy for its operation.

The present invention is not limited to a specific type of motor, but is implemented as a Miller-cycle engine, in particular.

The engine 3 includes one or more cylinders 4, one of which is shown here. The cylinder 4 is supplied with supercharged (combustion) air by the supercharging system 8. The ATL 9 includes a compressor 13, which is driven or operated through a shaft 14 by a turbine (exhaust gas turbine) 15 having a variable turbine geometry (VTG) 17. The turbine 15 is thus in operative connection with/coupled to the compressor 13 through the shaft 14. The compressor 13 is arranged in an air line 5 to the engine 3, and the turbine 15 is arranged in an exhaust gas line 7 that removes exhaust gas from the cylinder 4. Thus, the compressor 13 can be operated with the exhaust gas from the engine 3 by the means that the turbine 15 is supplied with the exhaust gas from the engine 3 and is driven therewith. In addition, the ATL 9 is coupled to the controller 21.

The VTG 17 can be set by means of an adjusting mechanism. A wastegate 19 can be provided alternatively/in addition to the VTG 17. The exhaust gas supplied to the turbine 15, and accordingly an output of the compressor 13, can be set by means of the adjusting mechanism (and/or by means of the wastegate 19). Optionally, a multi-stage supercharging unit can also be provided. In other words, multiple ATLs 19 can also be provided.

In the example shown here, the electrically driven compressor 11 is located downstream of the compressor 13 and is coupled to the controller 21. A supply line of the electrically driven compressor 11 branches off from the air line 5, and a discharge line of the electrically driven compressor 11 rejoins the air line 5 downstream of the electrically driven compressor 11. In other words, the electrically driven compressor 11 is arranged in a bypass line of the air line 5.

The air supply to the electrically driven compressor 11 can be adjusted with the aid of a control device, for example a 3-way control valve, suitably arranged in the air line 5. Downstream of the compressor 13, the air (supplied to the internal combustion engine 3) can thus be directed completely through the electrically driven compressor 11. Furthermore, the control device can be adjusted such that the air precompressed by the compressor 13 does not flow through the electrically driven compressor 11. The control device can also (completely) suppress an air supply to the internal combustion engine 3, so that neither the air from the electrically driven compressor 11 nor the air precompressed by the compressor 13 can be supplied to the internal combustion engine 3. Lastly, the quantity of air supplied to the internal combustion engine 3 can be adjusted by means of the control device. The control device can thus perform a throttling function, as in the case of a classic throttle valve, for example.

The electrically driven compressor 11 can also be located upstream of the compressor 13 in the air line 5.

A charge air cooler that cools the precompressed air supplied to the internal combustion engine 3 can be arranged in the air line 5 downstream of the compressor 13 and the electrically driven compressor 11.

Figure 2:
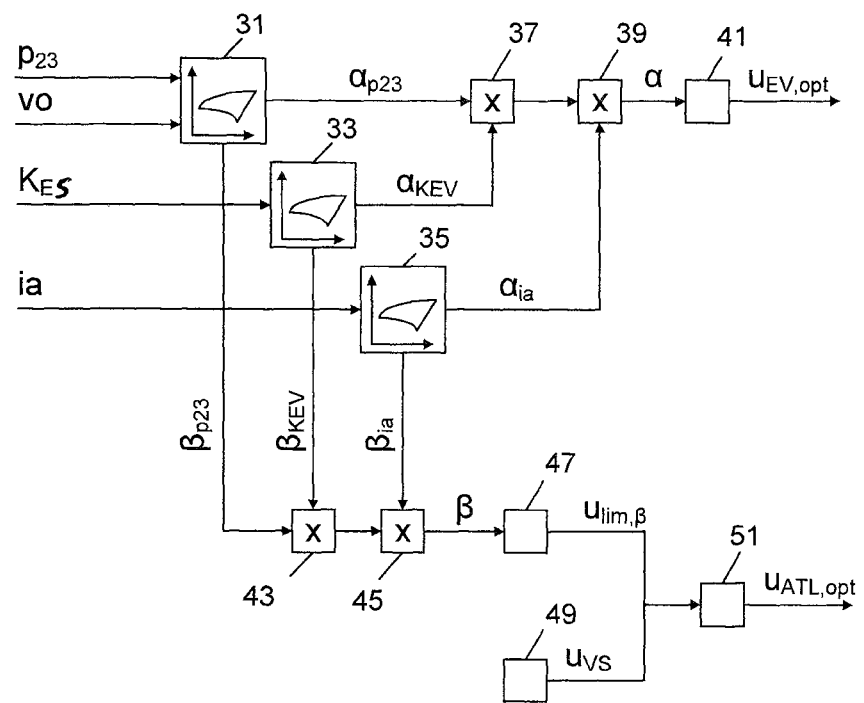
FIG. 2 shows a determination of control variables for a supercharging system of the internal combustion engine according to a first variant.

FIG. 2 schematically shows how a control variable (setpoint) $u_{EV,opt}$ for the electrically driven compressor 11 and a control variable (setpoint) $u_{ATL,opt}$ for the ATL 9 are determined. Thus, a partial reduction factor $\alpha_{p23}$ for the electrically driven compressor 11 and a second partial reduction factor $\beta_{p23}$ for the ATL 9, which are dependent on an (actual) scavenging gradient $p_{23}$ and a valve overlap vo, are determined by means of a characteristic map 31. A partial reduction factor $\alpha_{KEV}$ for the electrically driven compressor 11 and a partial reduction factor $\beta_{KEV}$ for the ATL 9, which are dependent on the capacity $K_{ES}$ of the energy storage device 12, are determined from a characteristic map 33. In addition, a partial reduction factor $\alpha_{ia}$ for the electrically driven compressor 11 and a partial reduction factor $\beta_{ia}$ for the ATL 9, which are dependent on an ignition angle ia, are determined by means of a characteristic map 35.

In block 37, the partial reduction factors $\alpha_{p23}$ and $\alpha_{KEV}$ are offset against one another, in particular are multiplied. The quantity resulting from block 37 is then offset against the partial reduction factor $\alpha_{ia}$, in particular multiplied, in block 39. In this way, a reduction factor $\alpha$ for the electrically driven compressor 11 results at the output side of block 39. This reduction factor $\alpha$ is transformed/converted into the control variable $u_{EV,opt}$ by means of the block 41. An appropriate output of the electrically driven compressor 11, in particular its speed, is adjusted by means of the control variable $u_{EV,opt}$.

As described above for the partial reduction factors $\alpha_{p23}$, $\alpha_{KEV}$, $\alpha_{ia}$ for the electrically driven compressor 11, the partial reduction factors $\beta_{p23}$, $\beta_{KEV}$, $\beta_{ia}$ for the ATL 9 are also offset in corresponding blocks 43, 45, so that a reduction factor $\beta$ for the ATL 9 is ultimately determined. In block 51, the reduction factor $\beta$ is transformed/converted into the reduction-factor-dependent control variable $u_{lim,\beta}$ for the ATL 9, which is to say for the VTG 17 and/or the wastegate 19.

In addition, in block 49 a precontrol variable $u_{VS}$ is determined or predetermined, which the control variable $u_{ATL,opt}$ must reach at a minimum and/or exceed. For example, the precontrol variable $u_{VS}$ can be determined by means of the turbocharger main equation. To ensure that the control variable $u_{ATL,opt}$ reaches or exceeds the precontrol variable $u_{VS}$, the reduction-factor-dependent control variable $u_{lim,\beta}$ and the precontrol variable $u_{VS}$ enter into the input side at block 51. In block 51, the larger of the two control variables $u_{lim,\beta}$, $u_{VS}$ is chosen, which then results at the output side as the control variable $u_{ATL}$. If the two control variables $u_{lim,\beta}$, $u_{VS}$ are equal, then $u_{ATL,opt}$ corresponds to their value. A suitable output of the ATL 9, in particular its speed, is adjusted by means of the control variable $u_{ATL,opt}$. This means that the larger the control variable $u_{ATL,opt}$ is, the higher the speed of the ATL 9. In other words, the larger the control variable $u_{ATL,opt}$ is, the smaller the flow cross-section of the VTG is or the les exhaust gas flows through the wastegate 19.

From the characteristic maps 31, 33, 35, the partial reduction factors $\alpha_{p23}$, $\alpha_{KEV}$, $\alpha_{ia}$ for the electrically driven compressor 11 and the partial reduction factors $\beta_{p23}$, $\beta_{KEV}$, $\beta_{ia}$ for the ATL 9 are stored together in the corresponding characteristic maps 31, 33, 35 as a function of one another. The control variables $u_{EV,opt}$ and $u_{ATL,opt}$ that are determined then adjust the electrically driven compressor 11 or the ATL 9 such that a positive scavenging gradient is initially achieved relatively rapidly while taking into account the capacity of the energy storage device. In the positive scavenging gradient region, the ATL 9 is driven such that its output (and thus the boost pressure buildup coming from the ATL 9) is as high as possible without the scavenging gradient becoming negative, while at the same time the electrically driven compressor 11 is cut back in its output and thus consumes less energy provided by the energy storage device.

Figure 3A:
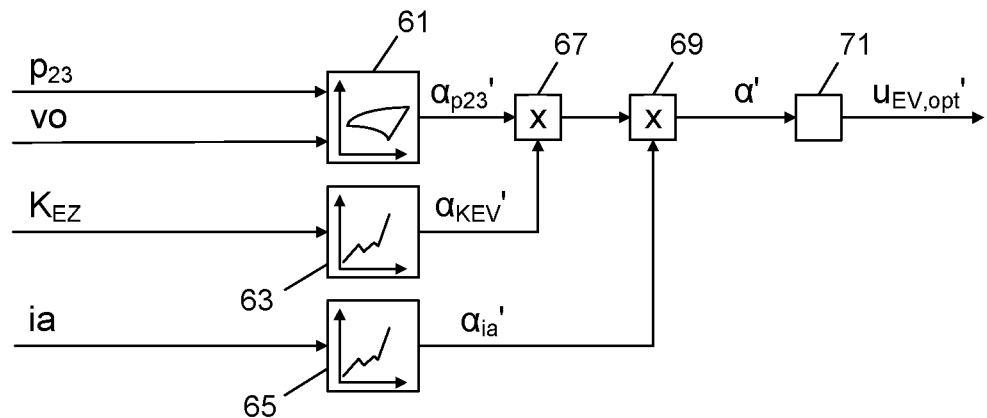
FIGS. 3a and 3b show a determination of control variables for the supercharging system of the internal combustion engine according to a second variant.
Figure 3B:
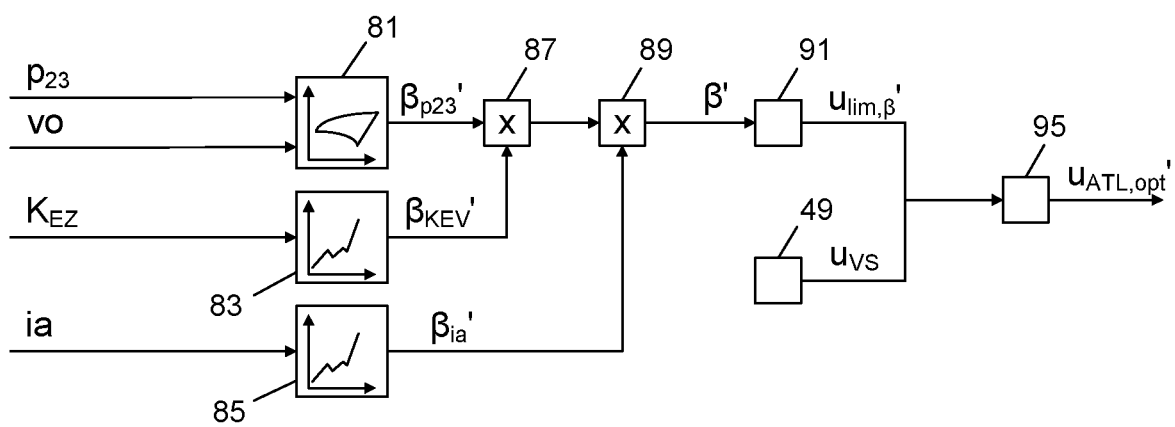

Shown in FIGS. 3a and 3b is an alternative for determining (setpoint) control variables $u_{EV,opt}'$ for the electrically driven compressor 11 and $u_{ATL,opt}'$ for the ATL 9. The difference from the approach from FIG. 2 is partial reduction factors $\alpha_{p23}'$, $\alpha_{KEV}'$, $\alpha_{ia}'$, which correspond to the partial reduction factors $\alpha_{p23}'$, $\alpha_{KEV}'$, $\alpha_{ia}'$, are determined from a characteristic map 61 or characteristic curves 63, 65, and the partial reduction factors $\beta_{p23}'$, $\beta_{KEV}'$, $\beta_{ia}'$, which correspond to the partial reduction factors $\beta_{p23}$, $\beta_{KEV}$, $\beta_{ia}$, are determined from a characteristic map 81 or characteristic curves 83, 85.

Thus, in FIG. 3a the partial reduction factor $\alpha_{p23}'$ for the electrically driven compressor 11, which depends on the (actual) scavenging gradient $p_{23}$ and the valve overlap vo, is determined by means of the characteristic map 61. The partial reduction factor $\alpha_{KEV}$, which depends on the capacity $K_{ES}$ of the energy storage device 12, is determined from the characteristic map 33. In addition, the partial reduction factor $\alpha_{ia}'$, which depends on the ignition angle ia, is determined by means of the characteristic map 65. In block 67, the partial reduction factors $\alpha_{p23}'$ and $\alpha_{KEV}'$, are offset against one another, in particular are multiplied. The quantity resulting from block 67 is then offset against the partial reduction factor $\alpha_{ia}'$, in particular multiplied, in block 69. In this way, a reduction factor $\alpha'$ for the electrically driven compressor 11 results at the output side of block 69. This reduction factor $\alpha'$ is transformed/converted into the control variable $u_{EV,opt}'$ by means of the block 71. An appropriate output of the electrically driven compressor 11, in particular its speed, is adjusted by means of the control variable $u_{EV,opt}'$.

FIG. 3b shows schematically how the (setpoint) control variable $u_{ATL,opt}'$ for the ATL 9 is determined, wherein this control variable $u_{ATL,opt}'$ is determined in a manner similar to the control variable $u_{EV,opt}'$ for the electrically driven compressor 11. Partial reduction factors $\beta_{p23}'$, $\beta_{KEV}'$, $\beta_{ia}'$ are likewise determined, which are dependent on the (actual) scavenging gradient $p_{23}$, on the valve overlap vo, on the capacity $K_{ES}$, or on the ignition angle ia. A characteristic map 81 and characteristic curves 83, 85 have accordingly been created for determination of the partial reduction factors $\beta_{p23}'$, $\beta_{KEV}'$, $\beta_{ia}'$. As described above, the partial reduction factors $\beta_{p23}'$, $\beta_{KEV}'$, $\beta_{ia}'$ are also offset, in particular multiplied, in corresponding blocks 87, 89, so that lastly a reduction factor $\beta'$ for the ATL 9 is determined. In block 91, the reduction factor $\beta'$ is transformed/converted into the reduction-factor-dependent control variable $u_{lim,\beta}'$ for the ATL 9, which is to say for the VTG 17 and/or the wastegate 19. Block 49 for determining the precontrol variable $u_{VS}$ is present here, as well. In a manner analogous to block 51, it is ensured by means of block 95 that the larger of the two control variables $u_{lim,\beta}'$, $u_{VS}$ present at the input side of block 95 results as the output quantity $u_{ATL,opt}'$.

In FIGS. 3a and 3b, the control variables $u_{EV,opt}'$, $u_{ATL,opt}'$ are determined without dependence on one another. It is true that this approach can load the energy storage device 12 comparatively more than the approach from FIG. 2, but the control variables $u_{EV,opt}'$, $u_{ATL,opt}'$ are determined especially easily.

Figure 4:
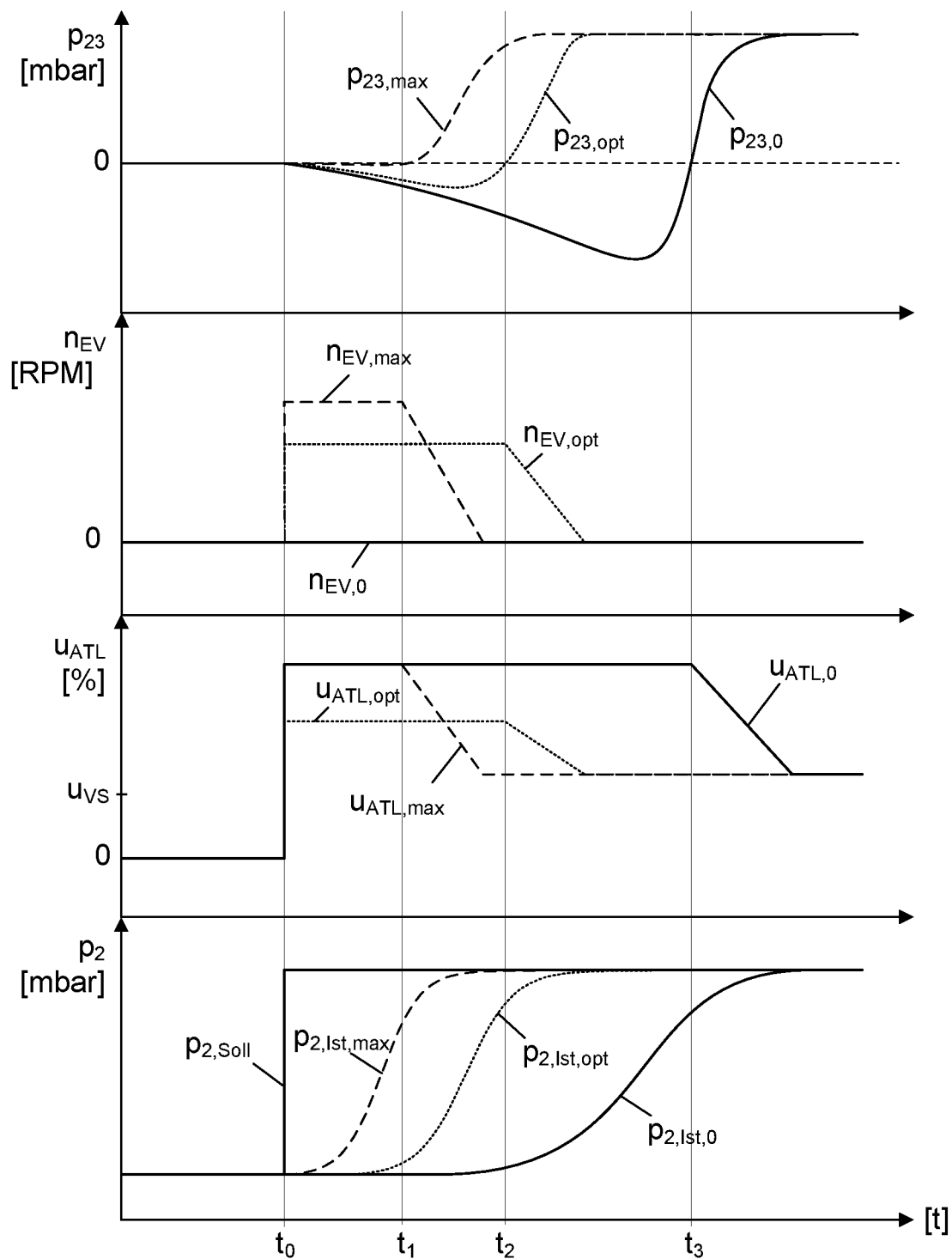
FIG. 4 shows curves of operating parameters of the internal combustion engine and the supercharging system.

FIG. 4 shows qualitative and schematic curves for the scavenging gradient $p_{23}$, for a speed $n_{EV}$ of the electrically driven compressor 11, for the control variable $u_{ATL}$ for the ATL 9, and for the boost pressure $p_2$. The speed $n_{EV}$ of the electrically driven compressor 11 is adjustable by means of the control variable $u_{EV}$ for the electrically driven compressor 11. The speed $n_{EV}$ thus reflects the output of the electrically driven compressor 11. A boost pressure setpoint curve $p_{2,soll}$ is shown that is necessary for implementing the driver command or the engine torque setpoint, wherein the driver command is detected at the time $t_0$.

Also shown is a curve for a scavenging gradient $p_{23,0}$, in which the electrically driven compressor 11 is not operated. It can be seen that the scavenging gradient $p_{23,0}$ exhibits a comparatively high excursion into the negative region and that a minimum of the scavenging gradient $p_{23,0}$ is present comparatively later in time. It can also be seen that the curve for the scavenging gradient $p_{23,0}$ does not reach the positive region until a comparatively late time $t_3$. The reason for this is that in this case an actual boost pressure $p_{2,ist,0}$ is built up only by the ATL 9. On the other hand, the control element 17, 19 (which is to say the VTG and/or wastegate 19) is adjusted by means of an appropriate control variable $u_{ATL,0}$ in order to temporarily increase, in particular to maximize, the drive output of the turbine 15, as a result of which the exhaust gas back pressure $p_3$ abruptly rises. In contrast, the actual boost pressure $p_{2,ist,0}$ is built up with a comparatively large delay on account of the high exhaust gas back pressure $p_3$, since the exhaust gas back pressure $p_3$ reduces a fresh air charging in the cylinder 4 due to exhaust gas pushing back. This results in the strong excursion of the scavenging gradient $p_{23,0}$ in the negative direction.

Also shown is a non-optimized curve $p_{23,max}$ in which the electrically driven compressor 11 is operated non-optimally, which is to say at a non-optimized speed $n_{EV,max}$, as a result of which it temporarily runs with its non-optimized maximum (speed) output. In other words, the electrically driven compressor 11 is operated at its component-dependent maximum speed. In addition, the ATL 9 is operated with a non-optimized control variable $u_{ATL,max}$, with which the ATL 9 is temporarily adjusted to a maximum possible speed setpoint. The non-optimized control variable $u_{ATL,max}$, like the control variable $u_{ATL,0}$, extends until the time $t_1$. Due to the non-optimized control variable $u_{ATL,max}$, the ATL 9 (or the control element 17) is temporarily adjusted to its actuator limit, as was the case earlier with the control variable $u_{ATL,0}$. As a result, a non-optimized boost pressure $p_{2,ist,max}$, and accordingly the positive scavenging gradient $p_{23}$, are built up comparatively rapidly at the time $t_1$, while the curve for the non-optimized scavenging gradient $p_{23,max}$ has a comparatively small excursion into the negative region before the time $t_1$. Since the electrically driven compressor 11 is temporarily operated with non-optimized maximum output, the energy stored (for operating the electrically driven compressor 11 by the energy storage device is consumed correspondingly faster.

An optimized (or in other words, ideal) scavenging gradient $p_{23,opt}$ is set by the means that the electrically driven compressor 11 is operated with an optimized speed $n_{EV,opt}$. This optimized speed $n_{EV,opt}$ is adjusted in accordance with the reduction factor $\alpha$ or the (reduction-factor-adjusted) control variable $u_{EV,opt}$. During this time, the control element 17, 19 is operated with an optimized (if applicable reduction-factor-adjusted) control variable $u_{ATL,opt}$, wherein the control variable $u_{ATL,opt}$ is greater at time $t_0$ than the precontrol variable $u_{VS}$. The control variable $u_{ATL,opt}$, like the control variable $u_{ATL,0}$, extends to time $t_0$. In comparison with the curve $p_{23,0}$, the optimized curve for the scavenging gradient $p_{23,opt}$ has a smaller excursion into a negative scavenging gradient region. In addition, the optimized scavenging gradient $p_{23,opt}$ becomes positive at an earlier time $t_2$, and the scavenging gradient $p_{23,0}$ only does so at a later time $t_3$.

It is also evident that the speed $n_{EV}$ of the electrically driven compressor 11 due to the optimized operation $n_{EV,opt}$ (or due to the faster establishment of the positive scavenging gradient) is lower as compared to the operation in the non-optimized operation $n_{EV,max}$. This does mean that in optimized operation the optimized actual boost pressure $p_{2,ist,opt}$ tracks the boost pressure setpoint $p_{25,soll}$ more slowly than does the non-optimized boost pressure $p_{2,ist,max}$. However, the capacity of the energy storage device is taken into account by the optimized operation of the electrically driven compressor 11.

In all cases, the speed $n_{EV}$ of the electrically driven compressor 11 and the control variable $u_{ATL}$ for the ATL 9 are reduced once the scavenging gradient $p_{23}$ reaches the positive region until the actual boost pressure $p_{2,ist}$ reaches, in particular substantially reaches, the boost pressure setpoint $p_{25,soll}$. Thereafter, the control variable $u_{ATL}$ for the ATL 9 is adjusted to an appropriate value for a steady-state operation of the internal combustion engine 3, and if applicable the electrically driven compressor 11 is taken out of operation, which is to say that its speed $n_{EV}$ is set to zero.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating an internal combustion engine with a supercharging system that has an exhaust turbocharger and an electrically driven compressor, an output of the exhaust turbocharger being adjustable via a control element, the method comprising:
   determining a boost pressure setpoint for achieving an increased engine torque setpoint;
   adjusting the supercharging system to build up an actual boost pressure, in accordance with the boost pressure setpoint, by adapting the output of the exhaust turbocharger via the control element; and
   adjusting a positive scavenging gradient in a cylinder of the internal combustion engine as an overriding command variable for driving the supercharging system,
   wherein the positive scavenging gradient is a pressure difference across the cylinder between an intake manifold pressure upstream of the cylinder and a pressure that is present within an exhaust gas line of the internal combustion engine downstream of the cylinder,
   wherein the positive scavenging gradient is achieved in that the electrically driven compressor and the exhaust turbocharger are operated as a function of one another,
   wherein the electrically driven compressor is operated in accordance with a first control variable, and the exhaust turbocharger is operated in accordance with a second control variable, wherein the first reduction factor and the second reduction factor are determined as a function of an actual scavenging gradient, of a valve overlap, of a capacity of an energy storage device, and of an ignition angle.

2. The method according to claim 1, wherein the control element includes a variable turbine geometry.

3. The method according to claim 2, wherein the adjustment of the supercharging system for achieving the boost pressure setpoint in a first operating state includes an operation of the electrically driven compressor with an optimized maximum output and an operation of the control element in a first, open position.

4. The method according to claim 3, wherein, when the positive scavenging gradient is reached in the first operating state, the output of the exhaust turbocharger for building up the actual boost pressure and, accordingly, an output of the electrically driven compressor is reduced in a second operating state.

5. The method according to claim 1 wherein the determination of the first reduction factor and the second reduction factors takes place via a plurality of characteristic maps and/or a plurality of characteristic curves.

6. The method according to claim 5, wherein the characteristic maps and/or the characteristic curves are determined empirically or by models.

7. The method according to claim 1, wherein the second control variable is greater than a predetermined precontrol variable.

8. The method according to claim 1, wherein the control element includes a wastegate.

9. A controller for a combustion engine, wherein the controller is configured to perform the method according to claim 1.

10. The method according to claim 1, wherein the overriding command variable defines that the supercharging system is initially driven such that the positive scavenging gradient is initially set in the cylinder and the actual boost pressure then tracks the boost pressure setpoint.

11. An internal combustion engine comprising:
   a supercharging system that has an exhaust turbocharger;
   an electrically driven compressor; and
   a controller, an output of the exhaust turbocharger being adjustable via a control element,
   wherein the internal combustion engine is configured to:
      adjust the supercharging system to build up an actual boost pressure, in accordance with the boost pressure setpoint, by adapting the output of the exhaust turbocharger via the control element; and
   adjust a positive scavenging gradient in a cylinder of the internal combustion engine as an overriding command variable for driving the supercharging system,
   wherein the positive scavenging gradient is a pressure difference across the cylinder between an intake manifold pressure upstream of the cylinder and a pressure that is present within an exhaust gas line of the internal combustion engine downstream of the cylinder,
   wherein the positive scavenging gradient is achieved in that the electrically driven compressor and the exhaust turbocharger are operated as a function of one another,
   wherein the electrically driven compressor is operated in accordance with a first control variable, and the exhaust turbocharger is operated in accordance with a second control variable,
   wherein the first control variable is determined based on a first reduction factor and the second control variable is determined based on a second reduction factor, and
   wherein the first reduction factor and the second reduction factor are determined as a function of an actual scavenging gradient, of a valve overlap, of a capacity of an energy storage device, and of an ignition angle.

12. A motor vehicle comprising the internal combustion engine according to claim 11.

* * * * *